United States Patent
Wang et al.

(10) Patent No.: US 9,134,765 B2
(45) Date of Patent: Sep. 15, 2015

(54) ADJUSTABLE KEYBOARD AND ELECTRONIC DEVICE EMPLOYING ADJUSTABLE KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hua-Yong Wang, Shenzhen (CN); Ji-Bing Guo, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 321 days.

(21) Appl. No.: 13/773,637

(22) Filed: Feb. 22, 2013

(65) Prior Publication Data
US 2013/0222995 A1 Aug. 29, 2013

(30) Foreign Application Priority Data
Feb. 24, 2012 (CN) .......................... 2012 1 0043296

(51) Int. Cl.
*G06F 1/16* (2006.01)
*F16M 1/00* (2006.01)
*G06F 3/02* (2006.01)

(52) U.S. Cl.
CPC .............. *G06F 1/166* (2013.01); *G06F 1/1613* (2013.01); *G06F 1/1667* (2013.01); *G06F 3/0208* (2013.01)

(58) Field of Classification Search
CPC ............................. G06F 1/1667; G06F 1/166
USPC .......................... 361/679.59, 679.01–679.45, 361/679.55–679.58; 248/677; 312/223.1, 312/223.2
See application file for complete search history.

(56) References Cited

U.S. PATENT DOCUMENTS

| | | | | |
|---|---|---|---|---|
| 6,097,595 | A * | 8/2000 | Cipolla ...................... | 361/679.21 |
| 7,733,645 | B2 * | 6/2010 | Hsu .......................... | 361/679.59 |
| 8,654,526 | B2 * | 2/2014 | Wu et al. .................. | 361/679.59 |
| 8,792,237 | B2 * | 7/2014 | Guo .......................... | 361/679.59 |
| 8,941,991 | B2 * | 1/2015 | Guo .......................... | 361/679.59 |
| 2010/0328859 | A1 * | 12/2010 | Chang ...................... | 361/679.01 |
| 2011/0222233 | A1 * | 9/2011 | Lu et al. .................... | 361/679.21 |
| 2013/0181906 | A1 * | 7/2013 | Guo .............................. | 345/169 |
| 2013/0229763 | A1 * | 9/2013 | Guo .......................... | 361/679.27 |
| 2013/0250495 | A1 * | 9/2013 | Yu ............................ | 361/679.01 |

* cited by examiner

*Primary Examiner* — Nidhi Thaker
(74) *Attorney, Agent, or Firm* — Novak Druce Connolly Bove + Quigg LLP (57) ABSTRACT

A keyboard includes an upper frame, a main body, a lower frame, and an adjustment mechanism. The two frames cooperate with each other to sandwich the main body. The lower frame includes a bottom plate defining a though hole. The adjustment mechanism includes a first adjustment member, a second adjustment member, a supporting member, a driving member and a position stopper. The supporting member protrudes from the bottom plate via the through hole to support the keyboard. The first driving member drives the supporting member to protrude from the bottom plate via the through hole when the first adjustment member is operated. The second driving member drives the supporting member to retract into a receiving space defined by the two frames when the second adjustment member is operated. The position stopper secures the supporting member when the first and the second adjustment members are not operated.

20 Claims, 10 Drawing Sheets

ADJUSTABLE KEYBOARD AND ELECTRONIC DEVICE EMPLOYING ADJUSTABLE KEYBOARD

BACKGROUND

1. Technical Field

The present disclosure relates to keyboards and more particular to adjustable keyboards and electronic devices employing the adjustable keyboards.

2. Description of Related Art

Portable electronic devices, such as personal computers and notebooks, are equipped with keyboards to be used as basic input devices. However, many keyboards can only maintain a single predetermined inclined angle with respect to a support apparatus (such as a desk), and cannot be adjusted to different angles, which can be inconvenient for users.

What is needed is to provide a keyboard that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

Figure 1:
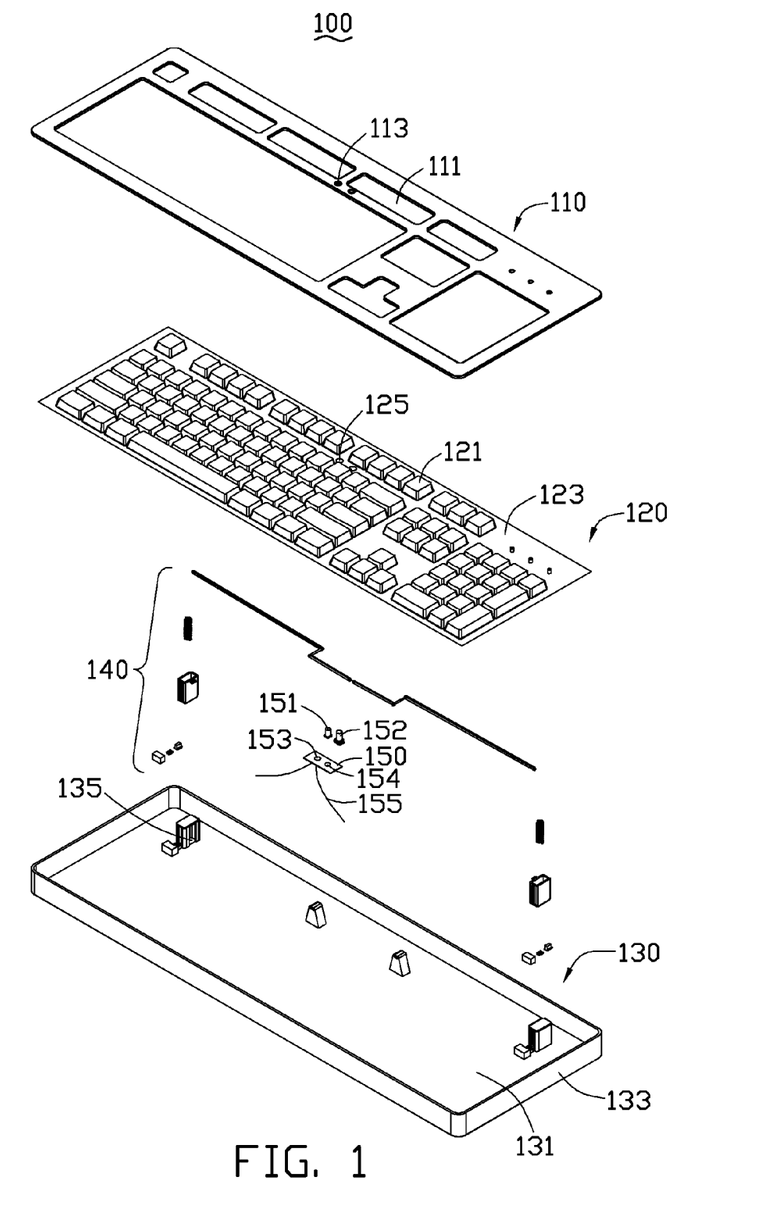
FIG. 1 is an exploded view of a keyboard according to one embodiment of the present disclosure, the keyboard including two adjustment mechanisms.
Figure 2:
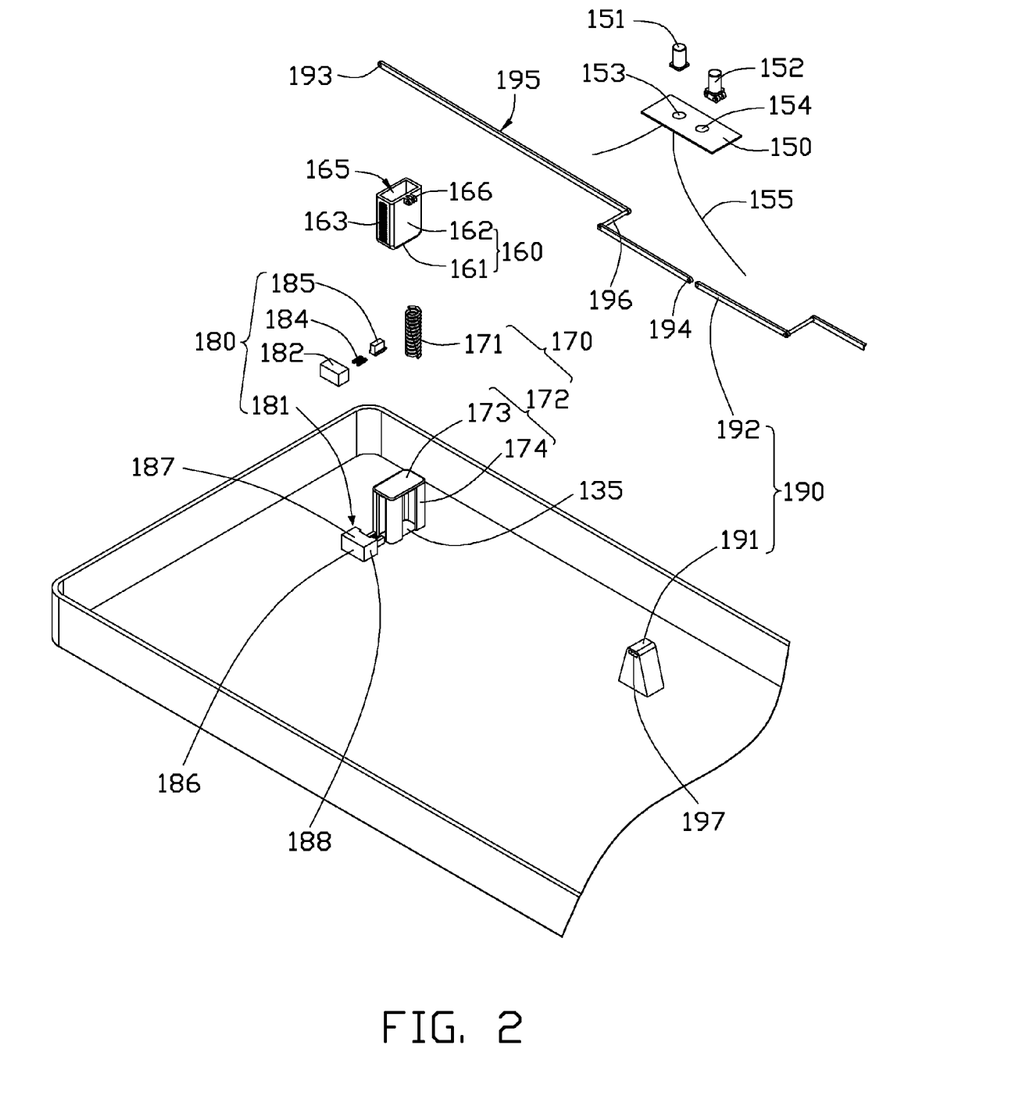
FIG. 2 is an enlarged exploded view of the adjustment mechanism of the keyboard of FIG. 1.
Figure 3:
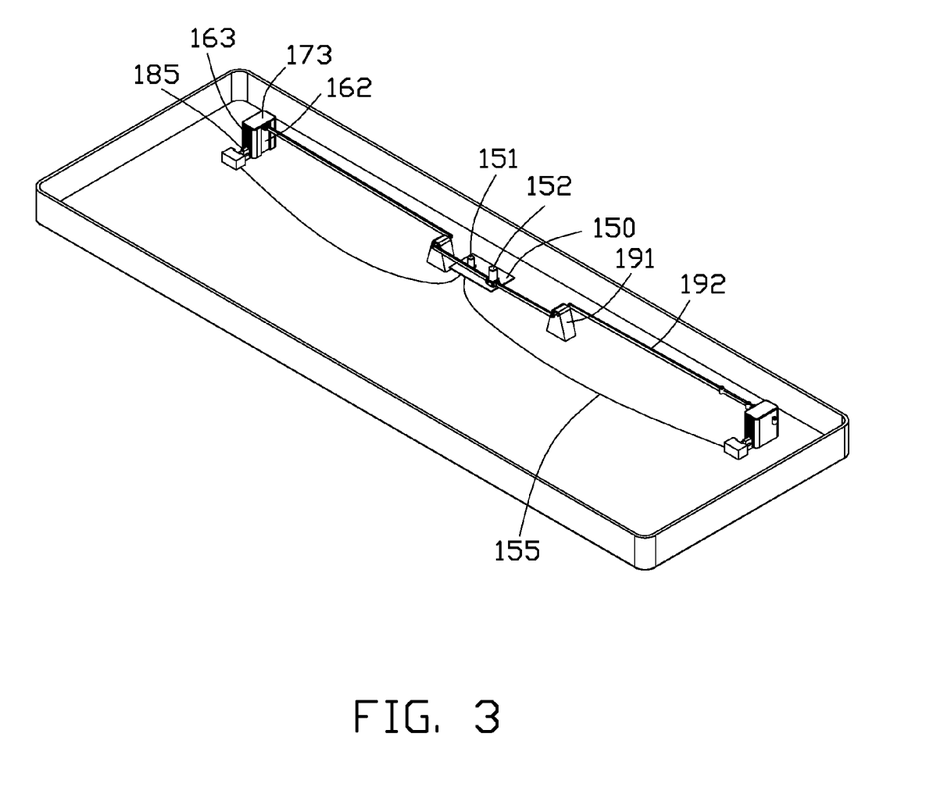
FIG. 3 is an assembled view of the adjustment mechanism of FIG. 2.
Figure 4:
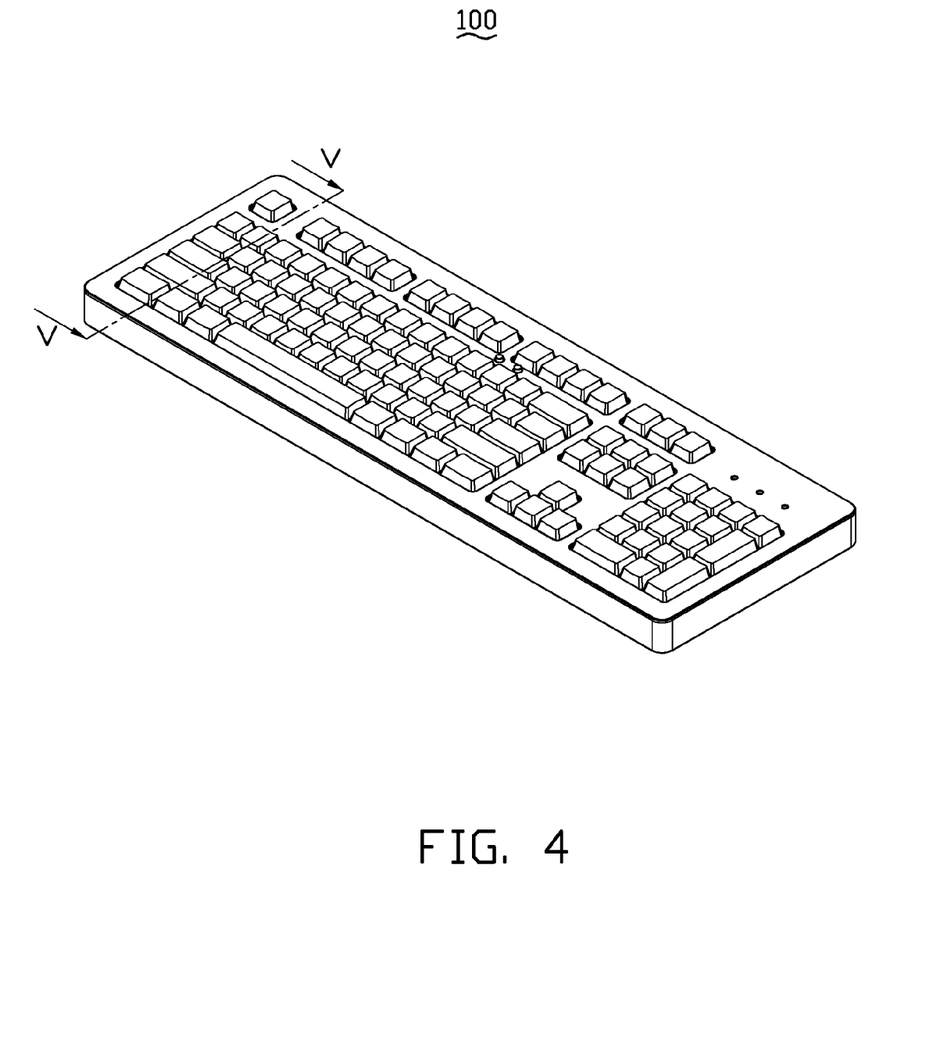
FIG. 4 is an assembled view of the keyboard of FIG. 1.

An exemplary embodiment of the present disclosure provides a keyboard 100. FIGS. 1-2 show that the keyboard 100 includes an upper frame 110, a main body 120 having a substrate 123 and a plurality of keys 121 fixed on the substrate 123, a lower frame 130, and an adjustment mechanism 140. The upper frame 110 and the lower frame 130 define a receiving space to receive the main body 120, and the upper frame 110 and the lower frame 130 fasten the main body 120 between the upper frame 110 and the lower frame 130. The adjustment mechanism 140 is configured to adjust an inclined angle of the keyboard 100.

The upper frame 110 includes a plurality of first openings 111 to expose the keys 121 through the upper frame 110 and two second openings 113 to expose a part of the adjustment mechanism 140 through the upper frame 110. The substrate 123 is a printed circuit board (PCB), and includes two third openings 125 corresponding to the two second openings 113. The lower frame 130 includes a bottom plate 131 and a plurality of sidewalls 133 extending perpendicularly from edges of the bottom plate 131. The bottom plate 131 defines two through holes 135 at two opposite sides of the bottom plate 131.

Referring to FIGS. 3-6, the adjustment mechanism 140 includes a first adjustment member 151, a second adjustment member 152, a circuit board 150, two wires 155, two supporting members 160, two first driving members 170, two second driving members 190, and two position stoppers 180. The two supporting members 160 correspond with the two through holes 135 and are positioned at two opposite sides of the keyboard 100 to balance the keyboard 100.

The first driving member 170 is configured to drive the corresponding supporting member 160 to move along a first direction X to protrude from the bottom plate 131 via the corresponding through hole 135 when the first adjustment member 151 is operated. In one embodiment, the first driving member 170 includes a positioning unit 172 and a first elastic element 171. The positioning unit 172 is fixed on the bottom plate 131 of the lower frame 130, and includes a top plate 173 positioned above the through hole 135 and parallel to the bottom plate 131, and a plurality of sidewalls 174 connected between the bottom plate 131 and the top plate 173 surrounding the through hole 135. The bottom plate 131 and the sidewalls 174 define a receiving space 164 to movably receive the supporting portion 160. The first elastic element 171 is located between the positioning unit 172 and the supporting member 160. The first elastic element 171 is a spring.

The supporting member 160 is configured to protrude from the bottom plate 131 via the through hole 135 to support the keyboard 100 on a supporting surface. In one embodiment, the supporting member 160 is positioned below the top plate 173 and is movably received in the receiving space 164. In the embodiment, the supporting member 160 is a hollow pillar, and includes a bottom plate 161, a plurality of sidewalls 162 which extend perpendicularly from the bottom plate 161, an engagement portion 166 located at one of the sidewalls 162, and a rack 163 located at another one of the sidewalls 162. The bottom plate 161 and the sidewalls 162 define the receiving space 164 and a fourth opening 165 opposite to the bottom plate 161. The receiving space 164 receives the first elastic element 171 via the fourth opening 165 between the bottom plate 161 and the top plate 173. The engagement portion 166 is exposed by an opening of the sidewalls 162, and is engaged with the second driving member 190. The rack 163 is exposed by another opening of the sidewalls 162, and the rack 163 mates with the position stopper 180 when both of the first adjustment member 151 and the second adjustment member 152 are not operated.

The position stopper 180 is configured to secure the supporting member 160 when both of the first adjustment member 151 and the second adjustment member 152 are not operated. In one embodiment, the position stopper 180 includes a positioning block 185, an electromagnet 182, a fixing element 181, and a second elastic element 184. The positioning block 185 is configured to secure the supporting member 160 and is magnetic, for example, the positioning block 185 is made of magnetic material and has a stopping end 189 configured to mate with the rack 163. The fixing element 181 is fixed on the bottom plate 131, and includes a fixing plate 186 extending perpendicularly from the bottom plate 131 to the upper frame 110, an extending plate 187 parallel to the bottom plate 131, and two connection plates 188 facing each other and connecting the extending plate 187, the fixing plate 186, and the bottom plate 131. The extending plate 187, the fixing plate 186, the connection plates 188, and the bottom plate 131 define a fourth receiving space to receive the electromagnet 182. The second elastic element 184 is positioned between the electromagnet 182 and the positioning block 185, and is configured to drive the positioning block 185 to secure the supporting member 160 by use of the stopping end 189. The electromagnet 182 is connected between the second elastic element 184 and the fixing plate 186, and the electromagnet 182 is configured to generate magnetic force to drive the positioning block 185 to release the supporting member 160 when one of the first adjustment member 151 and the second adjustment member 152 is operated. The second elastic element 184 has two springs in parallel.

The second driving member 190 is configured to drive the corresponding supporting member 160 to move along a second direction Y opposite to the first direction X to move into the receiving space defined in the upper frame 110 and the lower frame 130 via the corresponding through hole 135 when the second adjustment member 152 is operated. In one embodiment, the second driving member 190 includes two link levels 192 and two supporting elements 191. Each link level 192 includes a first end portion 193, an opposite second end portion 194, and a main portion 195 connecting the first end portion 193 and the second end portion 194. The first end portion 193 is engaged with the engagement portion 166 of the supporting member 160. The second end portion 194 is engaged with the second adjustment member 152. Each supporting element 191 is fixed on the bottom plate 131 to support the main portion 195, and includes a pivot hole 197. The main portion 195 is zigzag shaped, and includes a connection rod 196. The connection rod 196 is pivotably engaged with the pivot hole 197.

The circuit board 150 includes a first trigger portion 153 positioned below the first adjustment member 151 and a second trigger portion 154 positioned below the second adjustment member 152. Each wire 155 is electrically connected between the circuit board 150 and the corresponding electromagnet 182. The first trigger portion 153 is activated by the first adjustment member 151 to control the circuit board 150 to electrify the electromagnet 182 when the first adjustment member 151 is operated. The second trigger portion 154 is activated by the second adjustment member 152 to control the circuit board 150 to electrify the electromagnet 182 when the second adjustment member 152 is operated.

The first adjustment member 151 and the second adjustment member 152 are capable of being operated so as to adjust the inclined angle of the keyboard 100. In one embodiment, the first adjustment member 151 and the second adjustment member 152 are two adjustment buttons exposed through the upper frame 110 via the two second openings 113 respectively. In the embodiment, the second adjustment member 152 is engaged with two second end portions 194 of the two link levels 192.

Figure 5:
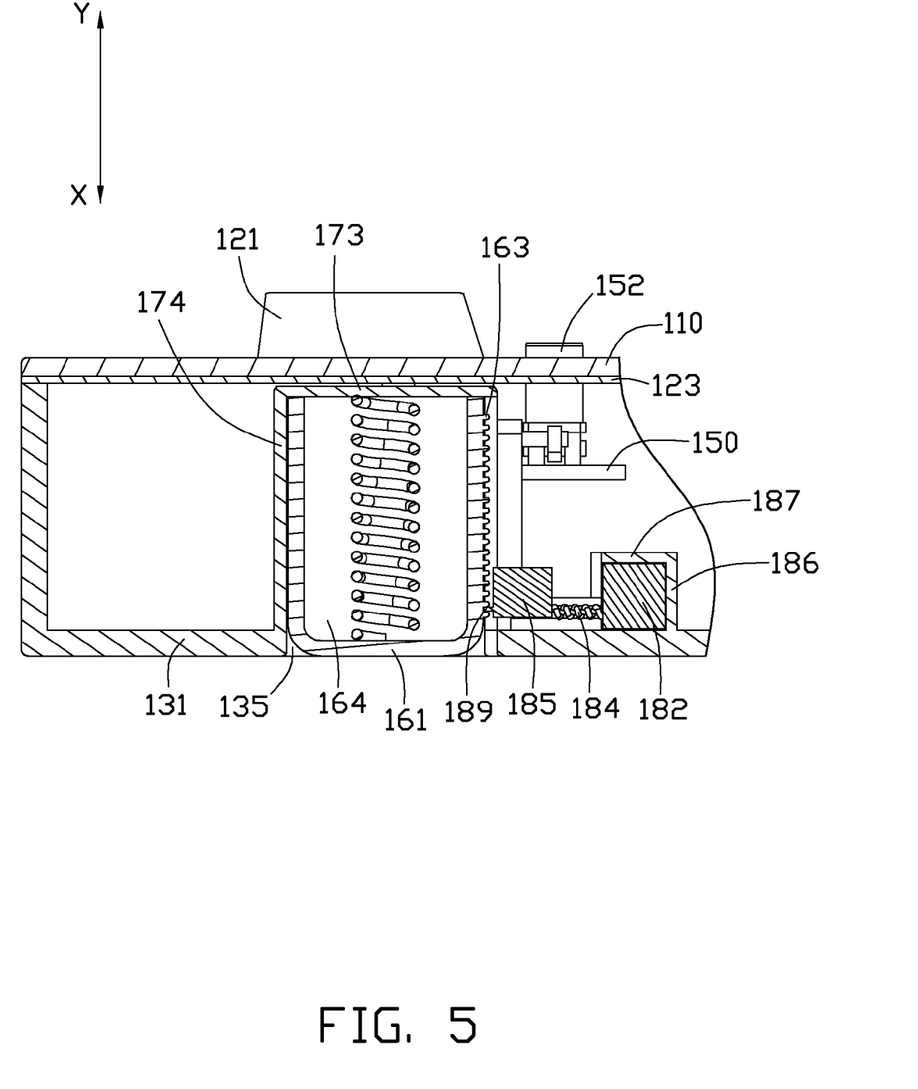
FIG. 5 is a cross-sectional view of the keyboard of FIG. 4 taken along line V-V.

When the keyboard 100 is in a first state as shown in FIG. 5, most of the second adjustment member 152 is received in the receiving space defined by the upper frame 110 and the lower frame 130, and the supporting member 160 is fully received in the receiving space 164 defined by the positioning unit 172. Furthermore, the first elastic element 171 is connected between the top plate 173 and the bottom plate 161 and is compressed, and the stopper end 189 mates with the rack 163 of the supporting member 160.

Figure 6:
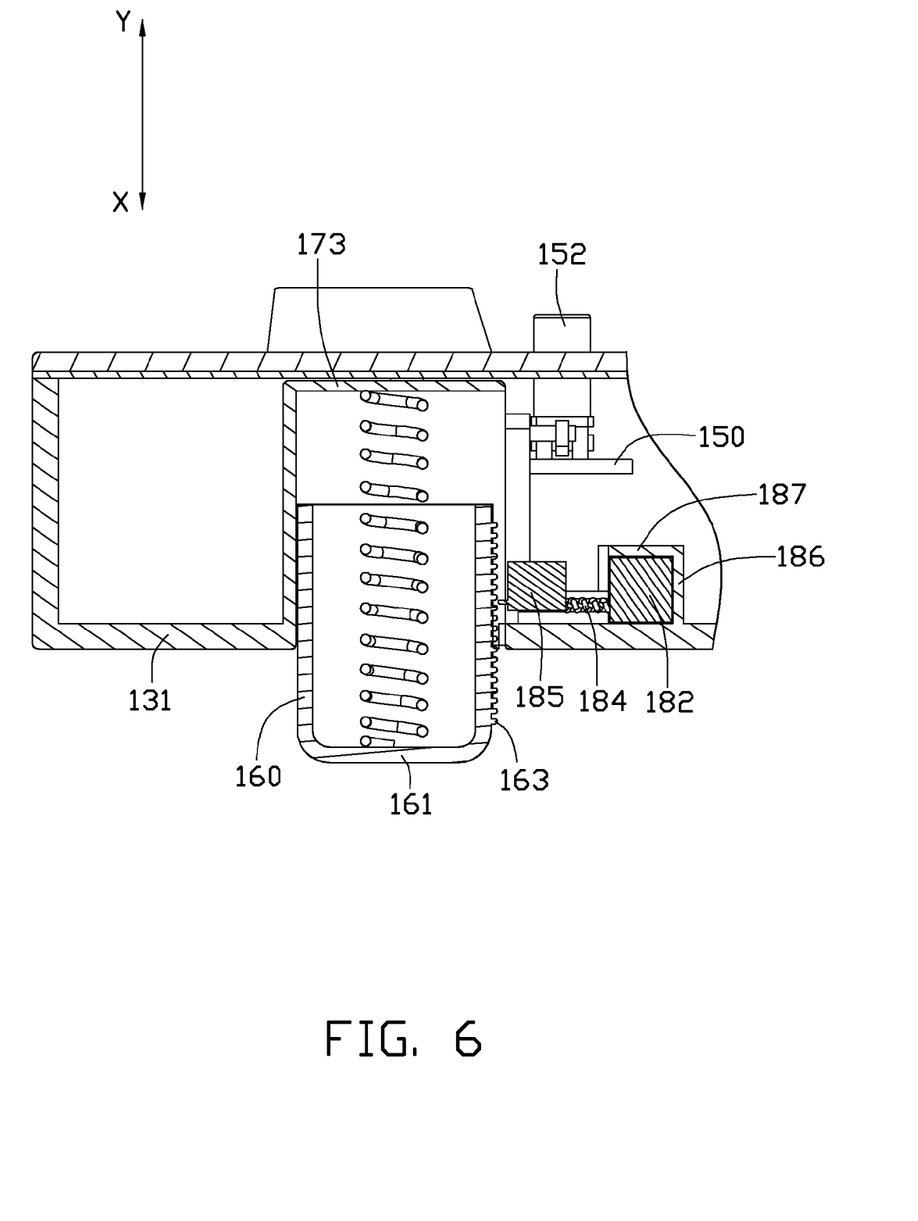
FIG. 6 is another view of part of the keyboard of FIG. 5, but showing the adjustment mechanism with the keyboard of FIG. 1 capable of being adjusted to a first inclined angle.

FIG. 6 shows when the first adjustment portion 151 is pressed by the user, the first trigger portion 153 is activated to control the circuit board 150 to electrify the electromagnet 182, such that the electromagnet 182 generates magnetic force to drive the stopper end 189 of the positioning block 185 to separate from the rack 163 of the supporting member 160, and the second elastic element 184 is compressed by the positioning block 185. Accordingly, the first elastic element 171 recovers and drives the supporting member 160 to move along the first direction X and protrude from the bottom plate 131. In addition, due to the link level 192 connected between the second adjustment member 152 and the supporting member 160, the second adjustment member 152 moves up such that most of the second adjustment member 152 protrudes from the upper frame 110.

Figure 7:
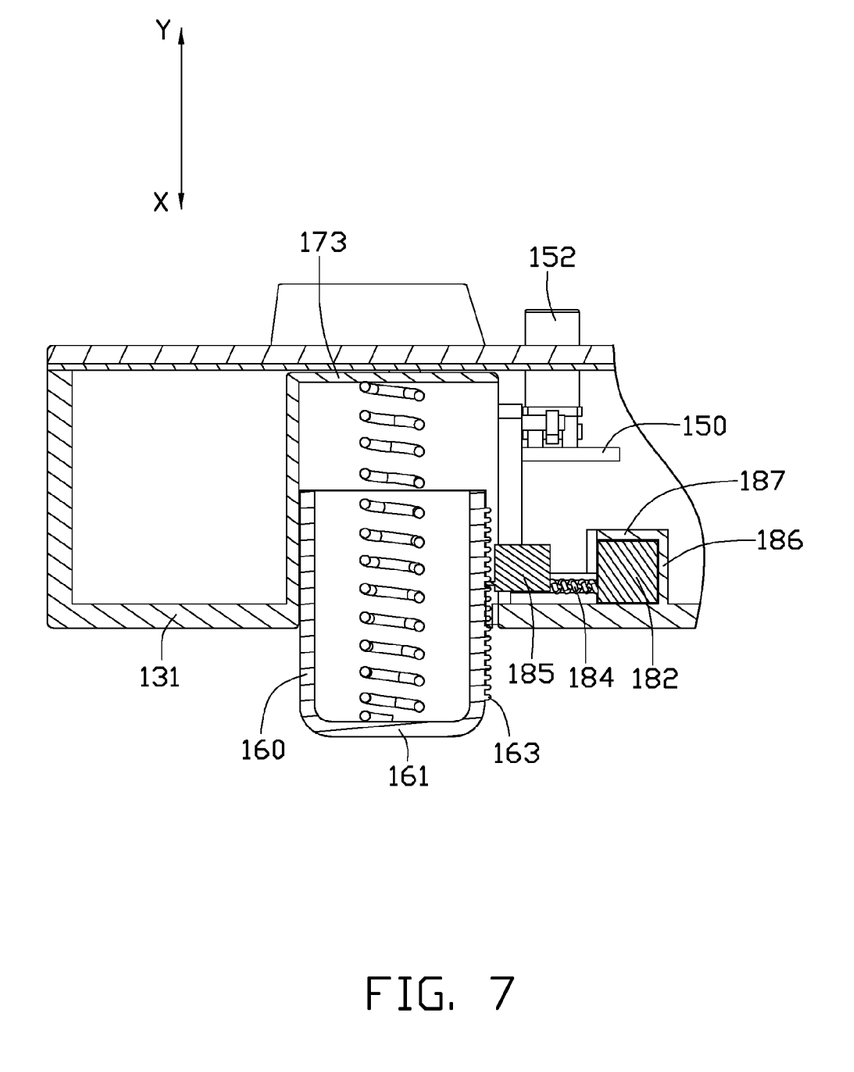
FIG. 7 is yet another view of part of the keyboard of FIG. 5, but showing the adjustment mechanism after being adjusted to the first inclined angle.

FIG. 7 shows when the supporting member 160 protrudes a desired distance, the first adjustment member 151 is released by the user, and the electromagnet 182 stops generating magnetic force. Accordingly, the second elastic element 184 recovers and drives the positioning block 185 to mate with the rack 163 of the supporting member 160 to stop the movement of the supporting member 160.

Figure 8:
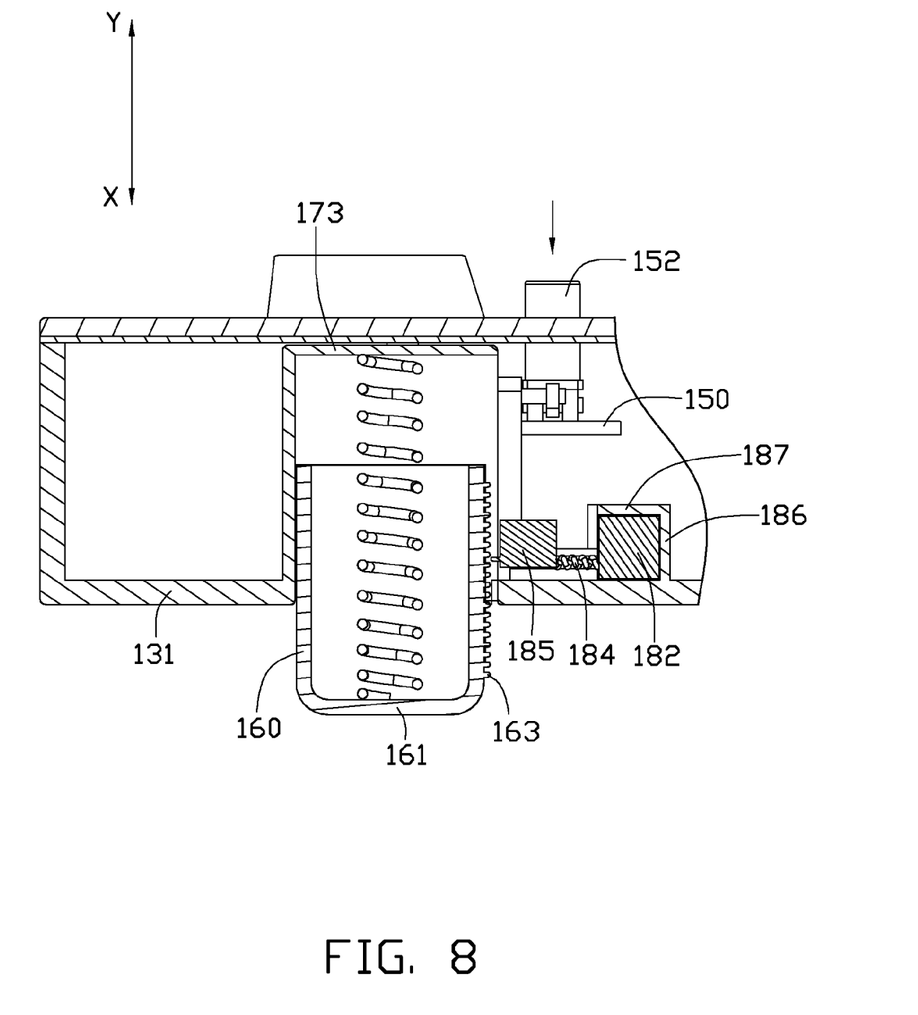
FIG. 8 is another view of part of the keyboard of FIG. 5, but showing the adjustment mechanism with the keyboard of FIG. 1 capable of being adjusted to a second inclined angle.

FIG. 8 shows when the second adjustment portion 152 is pressed by the user, the second trigger portion 154 is activated to control the circuit board 150 to electrify the electromagnet 182, such that the electromagnet 182 generates magnetic force to drive the stopper end 189 of the positioning block 185 to separate from the rack 163 of the supporting member 160, and the second elastic element 184 is compressed. Furthermore, the second adjustment member 152 is pressed down by the user to drive the supporting member 160 to move up via the link level 192, such that the supporting member 160 moves along the second direction Y and retracts into the receiving space defined by the upper frame 110 and the lower frame 130 via the through hole 135.

Figure 9:
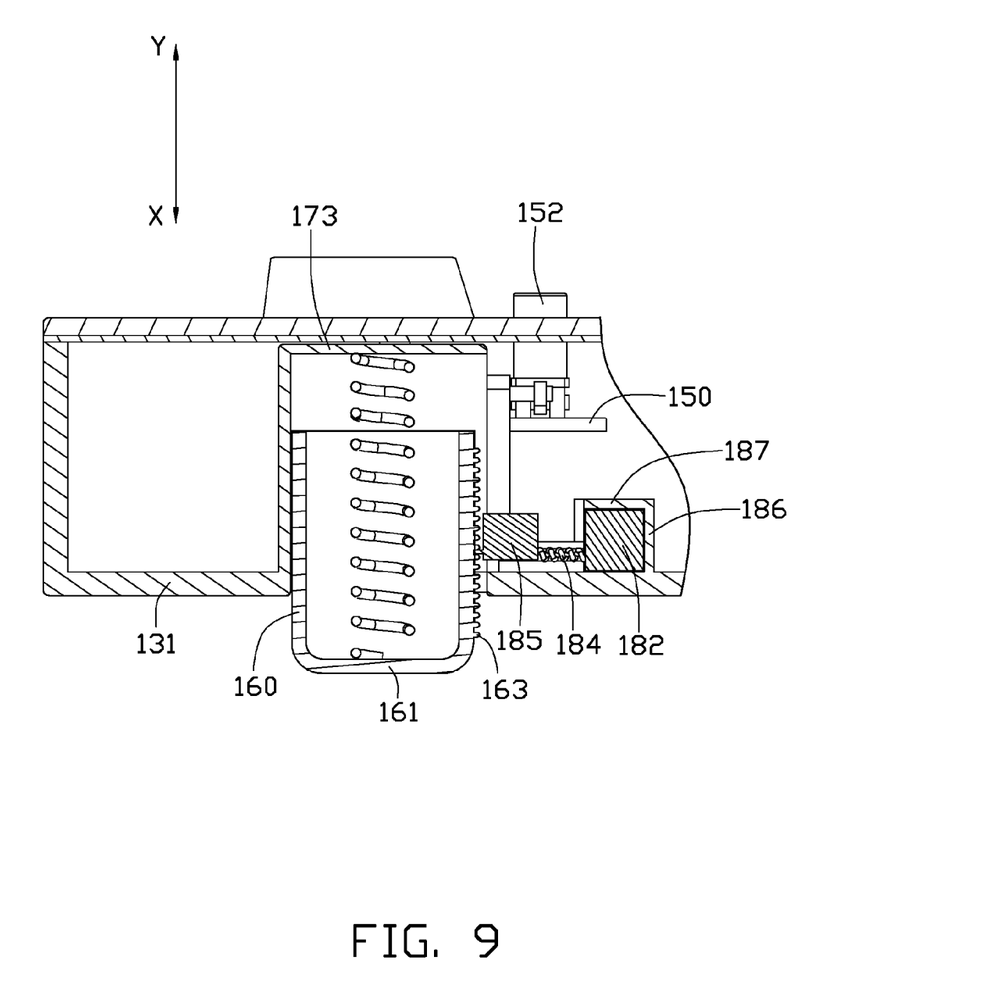
FIG. 9 is yet another view of part of the keyboard of FIG. 5, but showing the adjustment mechanism after being adjusted to the second inclined angle.

FIG. 9 shows when the supporting member 160 protrudes a desired distance, the second adjustment member 152 is released by the user, and the electromagnet 182 stops generating magnetic force. Accordingly, the second elastic element 184 recovers and drives the positioning block 185 to mate with the rack 163 of the supporting member 160 by the stopper end 189 to stop the movement of the supporting member 160.

In summary, the keyboard 100 includes the adjustment mechanism 140 which is able to adjust the distance the supporting member 160 protrudes from the bottom plate 131 when the keyboard 100 is positioned on a supporting surface, thus the keyboard 100 can hold different inclinations, which can be adjusted.

Figure 10:
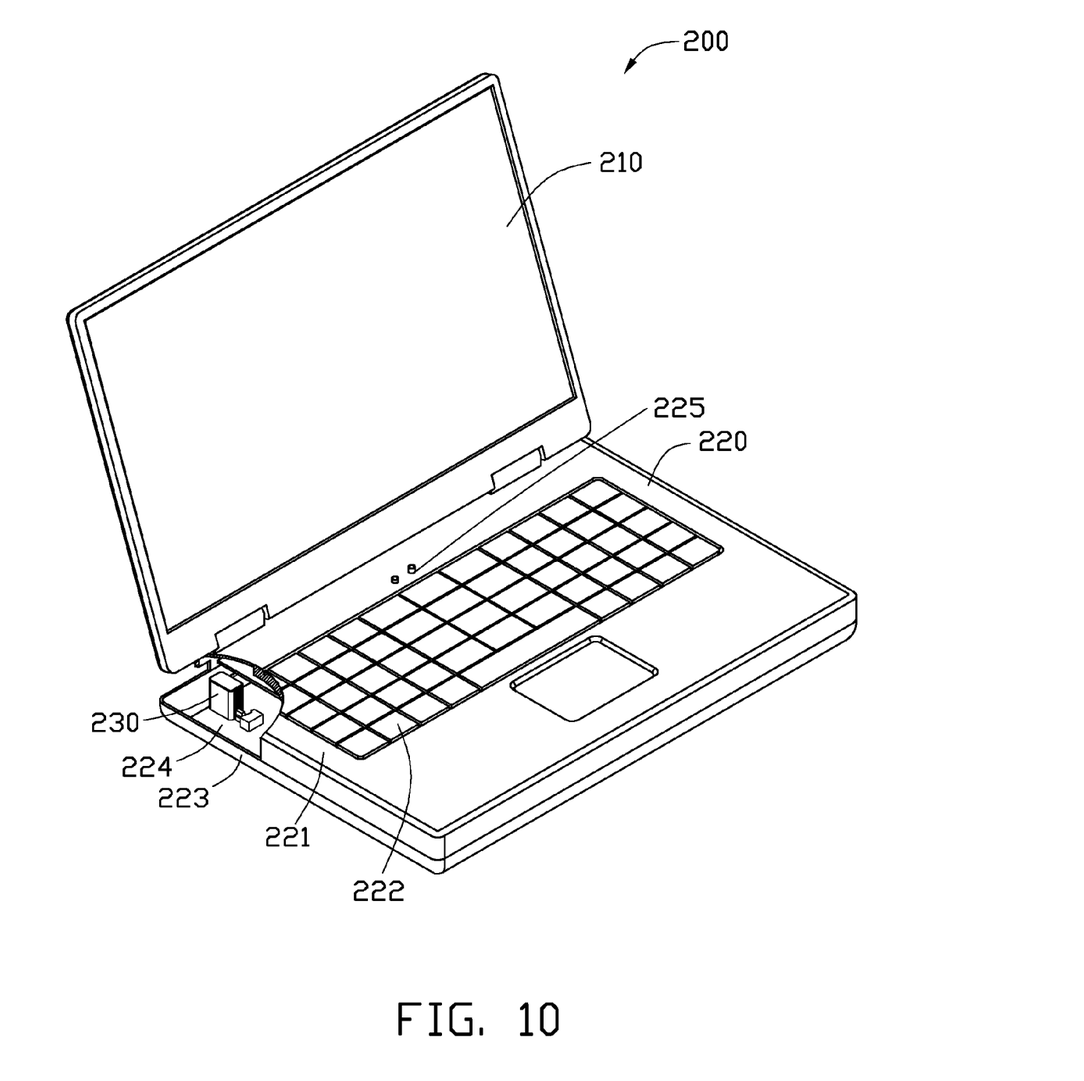
FIG. 10 is an isometric view of an electronic device employing the keyboard of FIG. 1 according to one embodiment of the present disclosure.

FIG. 10 shows that an electronic device 200 includes a display 210 and a keyboard 220 pivotably connected to the display 210. In the embodiment, the electronic device 200 is a laptop computer.

The keyboard 220 is similar to the keyboard 100 shown in FIG. 1. The keyboard 220 includes an upper frame 221, a lower frame 223, and a main body 222. The main body 222 is sandwiched between the upper frame 221 and the lower frame 223. The upper frame 221 defines a first opening (not labeled), and a plurality of keys are exposed through the upper frame 221 via the first opening. The lower frame 223 includes a bottom plate 224 for loading the main body 222. The bottom plate 224 defines a through hole (not labeled), and the upper frame 221 defines a second opening 225 corresponding to the through hole.

The keyboard 220 further includes an adjustment mechanism 230 to adjust the angle of the keyboard 220. The adjustment mechanism 230 is arranged between the upper frame 221 and the lower frame 223. The adjustment mechanism 230 is fastened in the through hole and the second opening 225. Two ends of the adjustment mechanism 230 are exposed through the keyboard 220 via the through hole and the second opening 225, correspondingly. In the embodiment, the structure and operating manner of the adjustment mechanism 230 is similar to the adjustment mechanism 140.

It is to be further understood that even though numerous characteristics and advantages of preferred and exemplary embodiments have been set out in the foregoing description, together with details of the structures and functions of the embodiments, the disclosure is illustrative only; and changes may be made in detail, especially in matters of shape, size and arrangement of parts within the principles of the present disclosure to the full extent indicated by the broad general meaning of the terms in which the appended claims are expressed.

What is claimed is:

1. A keyboard, comprising:
an upper frame comprising a plurality of first openings;
a main body having a plurality of keys exposed through the upper frame via the plurality of first openings;
a lower frame cooperating with the upper frame to fix the main body, the lower frame comprising a first bottom plate defining a through hole; and
an adjustment mechanism fixed on the first bottom plate and configured to adjust an inclined angle of the keyboard, the adjustment mechanism comprising a first adjustment member, a second adjustment member, a supporting member, a first driving member, a second driving member, and a position stopper, the first adjustment member and the second adjustment member configured to be operated by a user, the supporting member configured to protrude from the first bottom plate via the through hole to support the keyboard on a supporting surface, the first driving member configured to drive the supporting member to move along a first direction such that the supporting member protrudes from the first bottom plate via the through hole when the first adjustment member is operated, the second driving member configured to drive the supporting member to move along a second direction opposite to the first direction such that the supporting member retracts into a first receiving space defined by the upper frame and the lower frame via the through hole when the second adjustment member is operated, and the position stopper configured to secure the supporting member when the first adjustment member and the second adjustment member are not operated.

2. The keyboard of claim 1, wherein the first driving member comprises a positioning unit and a first elastic element, the positioning unit is fixed on the lower frame, and the first elastic element is located between the positioning unit and the supporting member.

3. The keyboard of claim 2, wherein the positioning unit comprises a top plate positioned above the through hole and parallel to the first bottom plate and a plurality of first sidewalls connected between the first bottom plate and the top plate surrounding the through hole, and the first bottom plate and the first sidewalls defines a second receiving space to receive the supporting member.

4. The keyboard of claim 3, wherein the supporting member comprises a second bottom plate, a plurality of second sidewalls extending perpendicularly from the second bottom plate, a third receiving space defined by the second bottom plate and the second sidewalls, and a second opening opposite to the second bottom plate, and the third receiving space receiving the first elastic element via the second opening.

5. The keyboard of claim 4, wherein the supporting member further comprises an engagement portion located at one of the second sidewalls, the first sidewalls defines a third opening to expose the engagement portion, the second driving member comprises a link level and a supporting element, the link level comprises a first end portion, an opposite second end portion, and a main portion connected between the first end portion and the second end portion, the supporting element is fixed on the first bottom plate to support the main portion, the first end portion is engaged with the engagement portion, the second end portion is engaged with the second adjustment member, and when the second adjustment member is pressed by the user, the second end portion moves along the first direction, the first end portion moves along the second direction to drive the supporting member to move along the second direction.

6. The keyboard of claim 5, wherein the main portion of the link level is zigzag shaped and comprises a connection rod, the supporting element comprises a pivot hole, the connection rod is pivotably engaged with the pivot hole.

7. The keyboard of claim 5, wherein the position stopper comprises a positioning block and an electromagnet, the positioning block is configured to secure the supporting member and is magnetic, and when one of the first and the second adjustment members is operated, the electromagnet is magnetized to generate a magnetic force to drive the positioning block to release the supporting member.

8. The keyboard of claim 7, wherein the position stopper further comprises a fixing element and a second elastic element, the fixing element is fixed on the first bottom plate, the second elastic element is positioned between the fixing element and the positioning block, and the second elastic element is configured to drive the positioning block to secure the supporting member when the first adjustment member and the second adjustment member are not operated.

9. The keyboard of claim 8, wherein the electromagnet is connected between the second elastic element and the fixing element.

10. The keyboard of claim 9, wherein the fixing element comprises a fixing plate extending perpendicularly from the first bottom plate to the upper frame, an extending plate parallel to first bottom plate, and two connection plates facing each other and connecting the extending plate, the fixing plate and the first bottom plate, and the extending plate, the fixing plate, and the first bottom plate define a fourth receiving space to receive the electromagnet.

11. The keyboard of claim 9, wherein the supporting member further comprises a rack located at one of the second sidewalls, the first sidewalls define a fourth opening to expose the rack, the positioning block comprises a stopping end, and the stopping end is configured to mate with the rack when the first adjustment member and the second adjustment member are not operated.

12. The keyboard of claim 10, wherein the adjustment mechanism further comprises a circuit board and a wire, the wire is connected between the circuit board and the electromagnet, the circuit board comprises a first trigger portion positioned below the first adjustment member and a second trigger portion positioned below the second adjustment member, when the first adjustment member is operated, the first trigger portion is activated and controls the circuit board to magnetize the electromagnet via the wire; when the second adjustment member is operated, the second trigger portion is activated and controls the circuit board to electrify the electromagnet via the wire.

13. A keyboard, comprising:
an upper frame comprising a plurality of first openings;
a main body having a plurality of keys exposed through the upper frame via the plurality of first openings;
a lower frame cooperating with the upper frame to define a first receiving space receiving the main body, the lower frame comprising a first bottom plate defining two though holes at two opposite sides of the first bottom plate; and
an adjustment mechanism fixed on the first bottom plate and configured to adjust an inclined angle of the keyboard, the adjustment mechanism comprising a first adjustment member, a second adjustment member, two supporting members, two first driving members, two second driving members, and two position stoppers, the first adjustment member and the second adjustment member configured to be operated by a user, each supporting member corresponding to a through hole and configured to protrude from the first bottom plate via the corresponding through hole to support the keyboard on a supporting surface, each first driving member configured to drive the corresponding supporting member to move along a first direction to protrude from the first bottom plate via the corresponding through hole when the first adjustment member is operated, each second driving member configured to drive the corresponding supporting member to move along a second direction opposite to the first direction and retract into the first receiving space via the corresponding through hole when the second adjustment member is operated, and each position stopper configured to secure the corresponding supporting member when the first adjustment member and the second adjustment member are not operated.

14. An electronic device, comprising: a display; and a keyboard pivotably connected to the display, the keyboard comprising: an upper frame comprising a plurality of first openings; a main body having a plurality of keys exposed through the upper frame via the plurality of first openings; a lower frame cooperating with the upper frame to fix the main body, the lower frame comprising a first bottom plate defining a though hole; and an adjustment mechanism fixed on the first bottom plate and configured to adjust an inclined angle of the keyboard, the adjustment mechanism comprising a first adjustment member, a second adjustment member, a supporting member, a first driving member, a second driving member, and a position stopper, the first adjustment member and the second adjustment member configured to be operated by a user, the supporting member configured to protrude from the first bottom plate via the through hole to support the keyboard on a supporting surface, the first driving member configured to drive the supporting member to move along a first direction such that the supporting member protrudes from the first bottom plate via the through hole when the first adjustment member is operated, the second driving member configured to drive the supporting member to move along a second direction opposite to the first direction such that the supporting member retracts into a first receiving space defined by the upper frame and the lower frame via the through hole when the second adjustment member is operated, and the position stopper configured to secure the supporting member when the first adjustment member and the second adjustment member are not operated.

15. The electronic device of claim 14, wherein the first driving member comprises a positioning unit and a first elastic element, the first elastic element is located between the positioning unit and the supporting member, the positioning unit is fixed on the lower frame, the supporting member comprises a second bottom plate, a plurality of second sidewalls extending perpendicularly from the second bottom plate, a second receiving space defined by the second bottom plate and the second sidewalls, and a second opening opposite to the second bottom plate, and the second receiving space receiving the first elastic element via the second opening.

16. The electronic device of claim 15, wherein the supporting member further comprises an engagement portion located at one of the second sidewalls, the first sidewalls defines a third opening to expose the engagement portion, the second driving member comprises a link level and a supporting element, the link level comprises a first end portion, an opposite second end portion, and a main portion connected between the first end portion and the second end portion, the supporting element is fixed on the first bottom plate to support the main portion, the first end portion is engaged with the engagement portion, the second end portion is engaged with the second adjustment member, and when the second adjustment member is pressed by the user, the second end portion moves along the first direction, and the first end portion moves along the second direction to drive the supporting member to move along the second direction.

17. The electronic device of claim 16, wherein the position stopper comprises a positioning block and an electromagnet, the positioning block is configured to secure the supporting member and is magnetic, and when one of the first and the second adjustment members is operated, the electromagnet is magnetized to generate a magnetic force to drive the positioning block to release the supporting member.

18. The electronic device of claim 17, wherein the position stopper further comprises a fixing element and a second elastic element, the fixing element is fixed on the first bottom plate, the second elastic element is positioned between the fixing element and the positioning block, and the second elastic element is configured to drive the positioning block to secure the supporting member when the first adjustment member and the second adjustment member are not operated.

19. The electronic device of claim 18, wherein the supporting member further comprises a rack located at one of the second sidewalls, the first sidewalls define a fourth opening to expose the rack, the positioning block comprises a stopping end, and the stopping end is configured to mate with the rack when the first adjustment member and the second adjustment member are not operated.

20. The electronic device of claim 19, wherein the adjustment mechanism further comprises a circuit board and a wire, the wire is connected between the circuit board and the electromagnet, the circuit board comprises a first trigger portion positioned below the first adjustment member and a second trigger portion positioned below the second adjustment member, when the first adjustment member is operated, the first trigger portion is activated and controls the circuit board to magnetize the electromagnet via the wire; when the second adjustment member is operated, the second trigger portion is activated and controls the circuit board to electrify the electromagnet via the wire.

* * * * *